Jan. 16, 1968　　　C. BRANDON　　　3,363,507
TWO STAR SIMULATOR
Filed Sept. 7, 1966
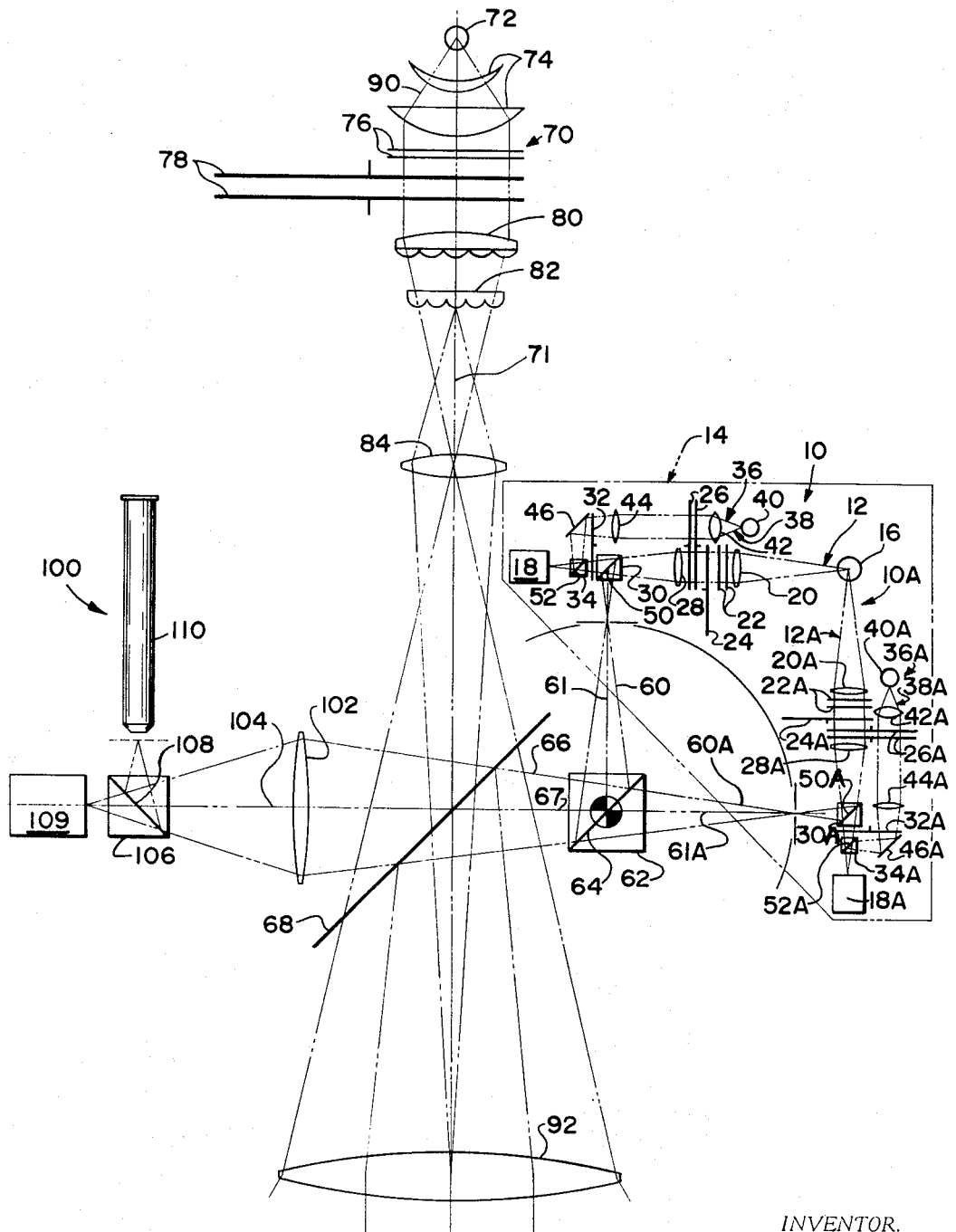
INVENTOR.
CHESTER BRANDON
BY
Constatine A. Michalos
ATTORNEY United States Patent Office 3,363,507
Patented Jan. 16, 1968

3,363,507
TWO STAR SIMULATOR
Chester Brandon, Curacao, Netherlands Antilles, assignor to General Precision Systems Inc., a corporation of Delaware
Filed Sept. 7, 1966, Ser. No. 577,660
10 Claims. (Cl. 88—24)

This invention relates to an improved optical instrument which can be used for the purpose of testing and calibrating star trackers, theodolites, and other instruments of a general class which are used for viewing astral bodies, and more particularly to a star simulator using optical means for generating two star light beams and a sky background light beam carrying visual representation of two stars in a sky background.

The present invention provides for a simulator instrument providing diffraction limited replicas of two stars with adjustments with respect to numerous variables in order that it can duplicate any conceivable natural condition such as means for individually varying the brightness as well as spectral distribution of two stars, the adjustment of color intensity of the sky background, and the separation between two stars which can be varied from zero superimposition to an angle of divergency of ten degrees. In addition the sky background can be adjusted to have a uniform luminance across the entire field or to have luminance gradient ranging up to twenty percent per degree in order that a duplicate of the sky condition near the sun or the horizon can be made.

Therefore, an object of this invention is to provide for a novel means of supplying a visual representation of two stars in a sky background.

Another object of this invention is to provide for a novel optical apparatus used as an instrument in the testing and calibrating of star trackers.

A further object of this invention is to provide an instrument for viewing astro bodies and which is capable of duplicating any conceivable natural condition.

An additional object of this invention is to provide for a star tracker providing diffraction limited replicas of two stars having color correcting filter means in adjusting spectral distribution of each star.

Further objects and advantages of the present invention will be specifically pointed out or will otherwise become apparent when referring, for a better understanding of the invention, to the following description taken in conjunction with the accompanying drawing, wherein:

The only figure in the drawing provides for a schematic view of one form of the invention illustrating the operative relationship between the elements of the invention.

Referring now to the drawing, it is shown that there are two star image generators or optical assemblies 10 and 10A for generating star images by use of two beams of collimated light or optical paths 12 and 12A. The two assemblies 10 and 10A may be mounted on a common fixed stable support or base plate 14 so that the two assemblies 10 and 10A can be located at right angles to one another for operating from a single star beam light source 16.

Inasmuch as the optical assemblies 10 and 10A are substantially identical, only one optical assembly 10 will be described, and duplicate numbers with the reference letter A would be applied to the corresponding elements of the other optical assembly 10A.

The first optical assembly 10, arranged in optical sequence and interposed between the light source 16 and an intensity sensor 18, includes a condenser lens 20, color correction filters 22 for adjustment of spectral distribution of the simulated star, a light chopper or light modulator disc 24, attenuator discs 26, a condenser lens 28, a beam splitting prism 30, and alternating shutter 32, and a second beam splitting prism 34.

To provide for calibration purposes there is used a first secondary optical system 36, having a first secondary optical path 38 parallel to the first optical path 12 which is directed through the first optical assembly 10. It comprises of a National Bureau of Standards, NBS, calibrated light source 40, a pair of condenser lens 42 and 44, and in juxtaposed relation to the beam splitter prism 34, a mirror 46 intersecting the optical path at a forty-five degree angle. It should be noted that the optical path between the light source 40 and the mirror 46 is also intercepted by the attenuator discs 26 and the alternating shutter 32.

In the operation of the first optical assembly 10, a beam of light from the light source 16 follows the first optical path 12 and passes through the lens 20, filters 22, modulator 24, attenuator discs 26, and lens 28 to beam splitting prism 30 which has a partially-reflecting surface 50 extending at a forty-five degree angle to the optical path 12. At this location part of the beam of light is rotated ninety degrees and the remainder of the beam of light of the optical path 12 passes through the prism 30, past the alternating shutter 32, to the second beam splitter 34. The beam splitter 34 likewise has a partially reflecting surface 52 extending at a forty-five degree angle to the optical path 12. Part of the beam which had passed through the partially reflecting surface 50 continues through the alternating shutter 32 to the surface 52 of the beam splitter 34 and then to the intensity sensor 18.

In addition, a beam of light from the calibrated light source 40 also enters the intensity sensor 18 in following the first secondary optical path 38 by passing through the lens 42, attenuator discs 26, lens 44 and the alternating shutter 32 to strike the mirror 46 which rotates the beam ninety degrees so that the beam strikes surface 52 to reflect to the intensity sensor 18 as shown.

It should be noted that the alternating shutter 32 is designed to alternately interrupt the respective beams from the light sources 16 and 40 so that the intensity sensor 18 receives light alternately from the two sources 16 and 40 for the purposes of comparison to permit calibration of the source 16. More specifically the intensity of the source 16 is adjusted until the light reaching the intensity sensor 18 therefrom is identical from that reached to the intensity sensor 18 from the standard calibrated light source 40.

Furthermore the filters 22 are selected to produce a desired spectral distribution for any particular star which may be simulated. In addition the light modulator disc 24 is designed to rotate and impart a characteristic scintillation to the star image. Star magnitude characteristics are controlled by rotary adjustment of the attenuator discs 26 which have angularly varying optical density. To avoid point-to-point variation in optical density across the beam width, two discs are used, which are arranged coaxially with their optical density gradients running in opposite angular directions.

It should be noted upon striking the beam splitter 30, that portion of the beam from the light source 16 which does not pass through the partially-reflected surface 50 is rotated ninety degrees to form one star image which is projected on a beam 60 as herein after more fully explained.

The optical assembly 10A generates a second star image which is projected on a beam 60A from beam splitter 30A. This beam 60A has an optical axis perpendicular to that of the beam 60. That is, in the same manner of the first optical assembly 10, the second optical assembly 10A provides for the second optical path 12A having the light source 16 passing through condenser lens 20A, through filters 22A, light chopper or modulator disc 24A, attenuator discs 26A and condenser lens 28A to beam splitting prism 30A which has partially-reflecting surface 50A extending at a forty-five degree angle to the second optical path 12A. As in the light path of the first assembly 10, the assembly 10A provides for part of the light beam to be rotated ninety degrees by the forty-five degree angle of the surface 50A and have the remainder of the beam pass through the prism 30A, past alternating shutter 32A to the second beam splitter 34A, which likewise has a partially reflecting surface 52A extending at a forty-five degree angle to the second optical path 12A. Part of the beam which was directed through the surface 50A of the prism 30A will pass through alternating shutter 32A through the surface 52A of beam splitter 34A to intensity sensor 18A.

To provide for calibrating of the second optical assembly 10A there is used second secondary optical system 36A having a second secondary optical path 38A parallel to the second optical path 12A. The second secondary optical path 36A provides for a light from second calibrating light source 40A to be directed to the intensity sensor 18A by passing through lens 42A, attenuator discs 26A, lens 44A and alternating shutter 32A. Next the beam strikes mirror 46A which rotates the beam ninety degrees so that the beam strikes surface 52A to reflect to the intensity sensor 18A as shown. As in the first optical path 12 of the system 10, it should be noted that the alternating shutter 32A is designed to alternately interrupt the respective beams from the light sources 16 and 40A so that the intensity sensor 18A receives light alternately from the two sources 16 and 40A for the purposes of comparison to permit the calibration of the source 16 in the second optical path 12A of light produced in the system 10A. Specifically, the intensity of the source 16 is adjusted until the light reaching the intensity sensor 18A therefrom is also identical to that of that reaching the intensity sensor 18A from the standard calibrated light source 40A.

Again in this system 10A filters 22A are selected to produce the desired spectral distribution for any particular star being simulated and the light modulator disc 24A is designed to rotate and impart the characteristic scintillation to the star image. Here again the star magnitude characteristics are controlled by rotary adjustment of the attenuator discs 26A which have angularly varying optical density. To avoid point-to-point variation in the optical density across the second beam width, two discs are used which are arranged coaxially with their optical density gradients running in opposite angular directions.

When the second path of light 12A strikes the beam splitter 30A that portion of the beam from the light source 16 which does not pass through the partially reflecting surface 50A is rotated ninety degrees to form another star image which is projected on beam 60A. Therefore, as herein described the first optical assembly 10 generates a first star image which is projected by the beam 60 from the first beam splitter 30 and the second optical assembly 10A generates a second star image which is projected by the beam 60A from the second beam splitter 30A. As shown, the beam 60, produced by the beam splitter 30, has an optical axis 61 which is perpendicular to an optical axis 61A of the beam 60A which is produced by the beam splitter 30A.

Mounted for rotation about an axis perpendicular to the plane defined by the respective optical axes 61 and 61A of the star image beams 60 and 60A and passing through their point orbit intersection is a main beam splitting prism 62. In the illustrated position of the beam splitting prism 62 which, for ease of reference, will be termed the normal position, a partially-reflective surface 64 makes a forty-five degree angle with respect to the optical axes 61 and 61A of both star image beams 60 and 60A. A portion of the beam 60A passes through the surface 64 of the prism 62, and a portion of the beam 60 is reflected by surface 64 to form a combined beam 66 having an axis 67 in which for the normal position of the prism 62 the star images are precisely superimposed. The combined beam 66 passes through a partially reflected combining plate 68 which intersects its axis 67 at forty-five degrees.

Another optical system 70, for generating sky background, is disposed with its optical axis 71 perpendicular to the axis 67 of the combined beam 66 and intersecting it at approximately the center of the combining plate 68. Optical system 70 includes a light source 72, collector lenses 74, filters 76, attenuator discs 78, mosaic lenses 80 and 82 and a field lens 84. As in the star image generating optical assemblies 10 and 10A filters 76 serve to achieve the desired spectral distribution of light forming the sky background, and additionally, may include a polarizing filter for sky polarization in discrete steps.

Attenuator discs 78 are structurally and functionally the counterparts of attenuator discs 26 and 26A in the first and second optical paths 12 and 12A of the star image generators 10 and 10A. In the sky background optical system 70, a beam of light 90 is generated by the light source 72. A portion of this light 90 passes through the partially-reflective surface of the combining plate 68 and is combined with the portion of the star image beam 66 which is reflected from the surface of the plate 68. The background and the star images are thus directed to an objective lens 92 from whence it is utilized for the intended purposes, that is, for the evaluating or the calibration of a star tracker.

This invention also provides for a viewer means for viewing the superimposition of the two stars when these beams have been reflected, such as a monitoring optical system 100 for visually observing the star images. This optical system 100 comprises a field lens 102 having its optical axis 104 colinear with the axis 67 of the star image beam 66. When the prism 62 is in its normal position the beam travels to a beam splitter 106 having its partially-reflective surface 108 at an angle of forty-five degrees to the optical axis 104 of the field lens 102. Part of the beam travels through the partially-reflective surface 108 of the beam splitter 106 to a star separation sensor 109 and part is reflected to a monitoring microscope 110 having its optical axis perpendicular to the axis 104 of the field lens 102 at its intersection with the partially-reflective surfaces 108 of the beam splitter prism 106.

It should be noted that, if desired, a suitable conventional means, which is not shown in this case, may be provided for automatically controlling the rotational position of the attenuator discs 26 and 26A in order to maintain a constant preselected image intensity. This control might take the form of a servo mechanism operating in response to a signal from the intensity sensors 18 and 18A. In addition a means may also be provided for the precise adjustment of the angular position of the prism 62.

Generally in the operation of the dual beam star simulator instrument the star image generating optical systems 10 and 10A are adjusted and calibrated, in a manner already described, to produce image of stars of the desired magnitude and spectral distribution. Then, with prism 62 in the normal position and the apparatus as a whole properly adjusted, the two star images are superimposed and thus appear in both the monitoring microscope 110 and in the image produced by the objective lens 92. It is important to note that at this juncture the portion of start image beam 60 which is present in the beam 66 traverses prism 62 by a process of reflection whereas in the portion of the star image beam 60A present in the beam 66 traverses the prism by transmission and refraction. Now, let us assume that the prism 62 is rotated clockwise by a very small angle alpha. As a result of the physical laws governing reflection and refraction, the axis of the reflected beam 60 would be angularly displaced by an angle 2 alpha whereas the refracted beam 60A would be displaced by an angle which is a large fraction of alpha. Consequently there is apparent relative displacement between the star images. The divergence between the star images can be very precisely controlled and can vary from a very minute angle to a very substantial angle of about ten degrees.

While the present invention has been described in a preferred embodiment, it will be obvious to those skilled in the art that various modifications can be made therein within the scope of the invention, and it is intended that the appended claims cover all such modifications.

What is claimed is:

1. An optical star simulator for indicating visual representation of a pair of stars in a sky background comprising, a pair of star image generating means, each generating means including optical means for directing a beam of collimated light simulating a star, beam splitting means having partially reflective surface rotating the direction of part of each beam towards one another, and means for combining the two rotated parts of both beams for superimposition and for evaluation of said beams.

2. The structure of claim 1, further including filter means in each of said collimated light beams operably producing spectral distribution of each collimated light beam for the particular star simulated.

3. The structure of claim 1, further including filter means in each of said collimated light beams operably producing spectral distribution of each collimated light beam for the particular star simulated, and attenuator means individually controlling the stellar magnitude of each of the collimated light beams.

4. The structure of claim 1, further including a filter means in each of said collimated light beams operably producing spectral distribution of each collimated light beam for the particular star simulated, light modulator means operably imparting characteristic scintillation to each collimated light beam and attenuator means individually controlling the stellar magnitude of each of the collimated light beams.

5. The structure of claim 1, further comprising another optical means for generating sky background, and a partially reflective combining plate means operably intersecting each of said rotated part of each beam and thereby superimposing said parts for evaluating or calibrating purposes.

6. The structure of claim 1, further comprising further optical means for generating sky background including light source, collector lens and filter means operably directly a sky background light, attenuator means for controlling the stellar magnitude of the sky background light, mosaic lenses operably serving to achieve a desired spectral distribution of light forming the sky background, and combining means operably superimposing the two light beams with the star background means for simulating actual sky visual representation.

7. The structure of claim 1, whereby each of said beam splitting means operably transmits therethrough a second part of each beam and further comprising calibrating means superimposing a standard calibrated light onto the second part of the beam, means for alternately interrupting the second part of each respective beam of said collimated light and said standard calibrated light, and means for detecting and comparing the second part of said collimated light with said standard calibrated light and thereby adjusting said collimated light to that of the standard calibrated light.

8. The structure of claim 7, wherein said detecting and comparing of said collimated light with said standard calibrated light is an intensity sensor.

9. The structure of claim 6, further comprising a main beam splitter means operably receiving the rotated part of each of the collimated light for rotating one beam by reflection and rotating the other beam by refraction whereby the reflected beam will be angularly displaced by an angle of substantially two times the angle of refracted beam for detecting the relative displacement between the two optical paths and thereby the images of the stars can be very precisely controlled and can be varied from a very minute angle to a very substantial angle.

10. The structure of claim 9, further comprising viewer means for viewing the superimposition of the two beams as two stars in the sky when said beams are reflected and refracted and for detecting the angular rotation of the main beam splitter and thereby monitoring the image produced by the two beams and the sky background means.

References Cited
UNITED STATES PATENTS

| | | | |
|---|---|---|---|
| 2,483,216 | 9/1949 | Marshall | 88—24 |
| 2,827,829 | 3/1958 | Spitz et al. | 88—24 |

NORTON ANSHER, *Primary Examiner.*

J. W. PRICE, *Assistant Examiner.*